(12) United States Patent
Holst et al.

(10) Patent No.: US 10,200,423 B2
(45) Date of Patent: Feb. 5, 2019

(54) PRESENTING METHODS FOR JOINING A VIRTUAL MEETING

(71) Applicant: Cisco Technology, Inc., San Jose, CA (US)

(72) Inventors: Magnus Aaen Holst, Kjeller (NO); Nicolai Grødum, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 381 days.

(21) Appl. No.: 14/701,591

(22) Filed: May 1, 2015

(65) Prior Publication Data

US 2016/0323330 A1   Nov. 3, 2016

(51) Int. Cl.
- *G06F 15/16* (2006.01)
- *H04L 29/06* (2006.01)
- *H04L 12/18* (2006.01)

(52) U.S. Cl.
CPC .......... *H04L 65/4038* (2013.01); *H04L 12/18* (2013.01); *H04L 12/1822* (2013.01)

(58) Field of Classification Search
CPC ........................ H04L 65/4038; H04L 12/18
USPC .................. 709/204, 205, 206, 228, 237
See application file for complete search history.

(56) References Cited

U.S. PATENT DOCUMENTS

| | | | |
|---|---|---|---|
| 7,474,634 B1* | 1/2009 | Webster | H04L 12/1822 370/261 |
| 7,593,520 B1* | 9/2009 | Croak | H04M 3/385 379/202.01 |
| 7,664,490 B2 | 2/2010 | Aaby et al. | |
| 7,876,714 B2 | 1/2011 | Ethier et al. | |
| 8,045,489 B2 | 10/2011 | Lee et al. | |
| 8,286,183 B2 | 10/2012 | Baird et al. | |
| 8,375,132 B2 | 2/2013 | Hernanz | |
| 8,478,622 B2 | 7/2013 | Grodum | |
| 8,713,662 B2 | 4/2014 | Staurnes et al. | |
| 8,831,197 B2 | 9/2014 | Prabhune et al. | |
| 8,929,257 B1* | 1/2015 | Goepp | H04L 65/1076 370/260 |
| 2002/0116355 A1* | 8/2002 | Roschelle | G06Q 10/10 706/62 |
| 2005/0078612 A1* | 4/2005 | Lang | H04L 12/1818 370/260 |
| 2005/0197854 A1* | 9/2005 | Grosvenor | G06Q 10/10 709/204 |

(Continued)

OTHER PUBLICATIONS

Bowersox, "What is the architecture of a scalable URL shortener?", http://www.quora.com/What-is-the-architecture-of-a-scalable-URL-shortener, Aug. 2014, 3 pages.

(Continued)

*Primary Examiner* — Madhu Woolcock
(74) *Attorney, Agent, or Firm* — Edell, Shapiro & Finnan, LLC

(57) ABSTRACT

A computer-implemented method is provided in which a server receives from a user device a request to join an online meeting, the request including a meeting identifier for the online meeting. It is determined whether a meeting exists with a meeting identifier that matches the meeting identifier contained in the request. If a match is determined, a message is sent to the user device, the message indicating one or more join methods that the user device can use to join the online meeting.

20 Claims, 12 Drawing Sheets

(56) References Cited

U.S. PATENT DOCUMENTS

| | | | | |
|---|---|---|---|---|
| 2005/0233737 A1* | 10/2005 | Lin | H04L 12/581 | 455/416 |
| 2006/0265262 A1* | 11/2006 | Kamdar | G06Q 10/109 | 705/80 |
| 2007/0011233 A1* | 1/2007 | Manion | G06Q 10/10 | 709/204 |
| 2007/0143399 A1* | 6/2007 | Qi | G06Q 10/06311 | 709/204 |
| 2007/0143412 A1* | 6/2007 | Qi | G06Q 10/10 | 709/206 |
| 2009/0179983 A1* | 7/2009 | Schindler | H04L 12/1818 | 348/14.08 |
| 2011/0137993 A1* | 6/2011 | Yl | H04L 12/1822 | 709/204 |
| 2011/0164741 A1* | 7/2011 | Gisby | H04M 3/38 | 379/202.01 |
| 2012/0072505 A1* | 3/2012 | Patil | H04L 12/1822 | 709/206 |
| 2013/0018950 A1* | 1/2013 | Narayanan | H04L 65/403 | 709/204 |
| 2013/0202095 A1* | 8/2013 | Jones | H04M 3/563 | 379/32.01 |
| 2014/0117073 A1* | 5/2014 | Bell | H04L 12/1818 | 235/375 |
| 2014/0119243 A1* | 5/2014 | Oike | H04L 12/1831 | 370/260 |
| 2014/0136630 A1* | 5/2014 | Siegel | G06Q 10/1095 | 709/206 |
| 2014/0267571 A1* | 9/2014 | Periyannan | H04N 7/15 | 348/14.08 |
| 2014/0289646 A1* | 9/2014 | Munir | H04L 65/1093 | 715/753 |
| 2015/0172333 A1* | 6/2015 | Lindstrom | H04L 65/1016 | 370/261 |
| 2016/0171589 A1* | 6/2016 | Glover | G06Q 30/0631 | 705/26.7 |

OTHER PUBLICATIONS

B. Desruisseaux, "Internet Calendaring and Scheduling Core Object Specification (iCalendar)", IETF, Network Working Group, Category: Standards Track, RFC 5545, Sep. 2009, 168 pages.

Stack Overflow, "How to code a URL shortener?", http://stackoverflow.com/questions/742013/how-to-code-a-url-shortener, Aug. 28, 2014, 9 pages.

"Audio Controls Guide and Release Notes for FR29", Conferencing & Collaboration, User Guide, Cisco WebEx, Apr. 2012, 11 pages.

"WebEx Meeting Center User Guide", For Hosts, Presenters, and Participants, Cisco WebEx, www.webex.com, May 2, 2013, 414 pages.

\* cited by examiner

PRESENTING METHODS FOR JOINING A VIRTUAL MEETING

TECHNICAL FIELD

The present disclosure relates to meeting services.

BACKGROUND

Today, when a meeting organizer wants participants to attend a conference with Telepresence equipment or an online/web-bases service (such as the WebEx® online meeting service), the organizer needs to book all the infrastructure and equipment resources up-front, that is, at the time the meeting is scheduled. Thus, the meeting organizer needs to know what meeting service(s) are available, reserve those resources and distribute the join information to the meeting participants. The participants have no unified join experience, and have to find the correct client based on information passed from the meeting organizer or system.

DESCRIPTION OF EXAMPLE EMBODIMENTS

Overview

In one embodiment, a computer-implemented method is provided in which a server receives from a user device a request to join an online meeting, the request including a meeting identifier for the online meeting. It is determined whether a meeting exists with a meeting identifier that matches the meeting identifier contained in the request. If a match is determined, a message is sent to the user device, the message indicating one or more join methods that the user device can use to join the online meeting.

Example Embodiments

Presented herein are techniques that allow for hosting of virtual (web-based or online) meetings without knowing what technology is needed to support the meeting. These techniques allow participants to join meetings without the need to distribute information how to attend the meeting. In addition, techniques are provided for a single, unified join meeting experience for end users, regardless of meeting technologies available for the meeting.

Figure 1:
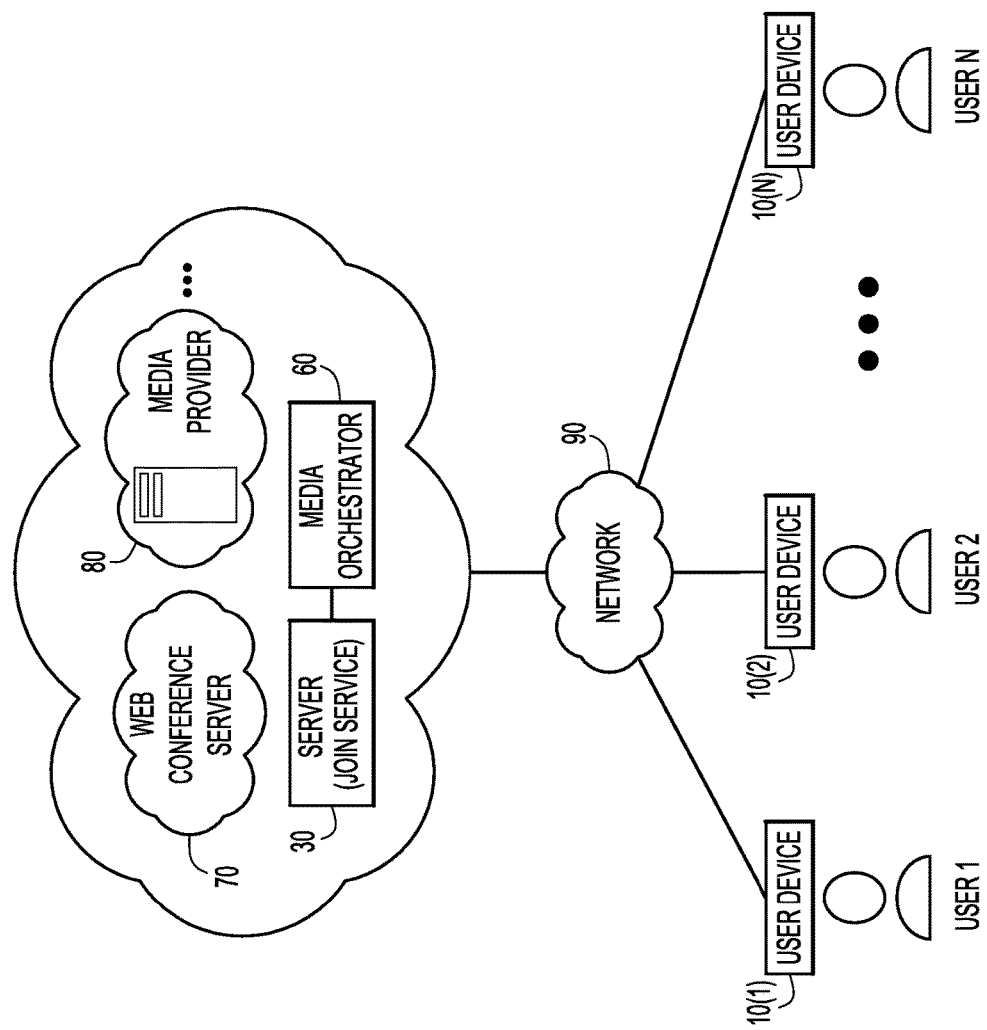
FIG. 1 is a diagram illustrating a system in which join methods are presented to a user of a user device attempting to join a virtual meeting, according to an example embodiment.

Referring first to FIG. 1, a diagram is shown of a network environment in which the apparatus, system, and methods presented herein may be deployed. FIG. 1 shows an example in which there are multiple user devices 10(1)-10(N). The user devices can take on a variety of forms, including a SmartPhone, tablet, laptop computer, desktop computer, video conference (e.g., Telepresence) endpoint etc. The user devices communicate with a server 30. The server 30 provides a join service that is brought into play at the time that a user clicks on a join link in order to join the virtual meeting.

FIG. 1 shows that the server 30, along with a media orchestrator function 60, a web conference server 70 and a media provider 80 may reside off premises in a cloud or data center computing environment. This is not meant to be limiting as the server 30 may reside on premises. The media orchestrator 60 ensures that all the participants get connected to the same meeting supported by the media provider 80, or in the case of multiple media providers, to the appropriate one or more media providers. The functions of the media orchestrator 60 and/or the media provider(s) 80 may be performed by separate entities as shown, or may be integrated into the functions performed by the server 30 (either on-premises, in the cloud, or a hybrid of on-premises and cloud). The user devices 10(1)-10(N) communicate with server 30 via a network 90. Network 90 may be any one or more of a wired or wireless local area network (LAN) and wired or wireless wide area network. The network 90 may support a variety of protocols, including without limitations, Session Initiation Protocol (SIP), Hypertext Transfer Protocol (HTTP), Real-time Transport Protocol (RTP), etc.

Figure 2:
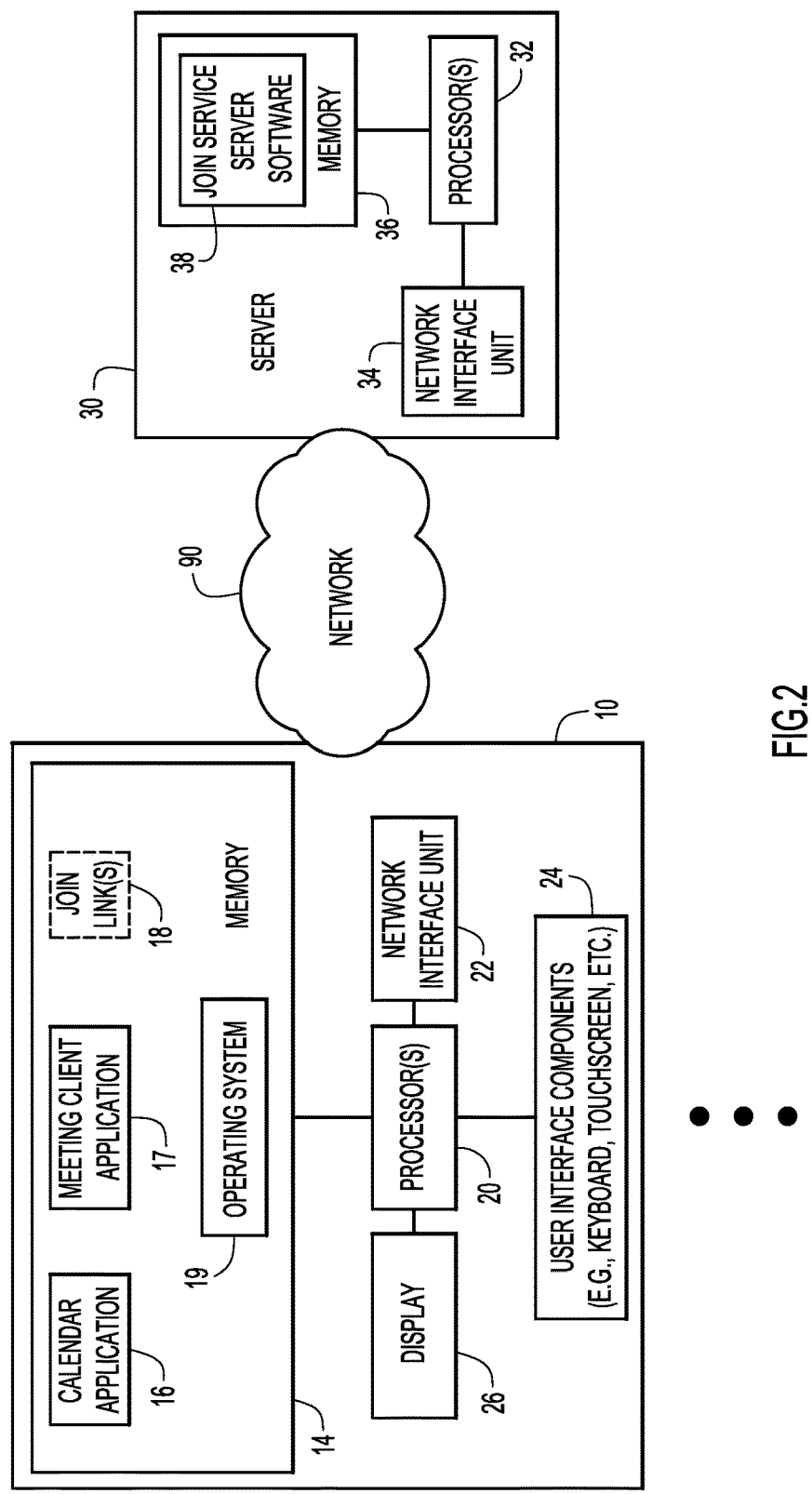
FIG. 2 is a block diagram of a user device and a server configured to support presentation of various join methods to a user when joining a virtual meeting, according to an example embodiment.

Reference is now made to FIG. 2. FIG. 2 shows a block diagram of a user device generically identified by reference numeral 10, and server 30. The user device 10 and server 30 are in communication with each other via network 90. The user device 10 is meant to be representative of any of the user devices 10(1)-10(N) shown in FIG. 1.

The user device 10 may include a memory 14 storing the software instructions a calendar application 16, a meeting client application 17 (e.g., web conference client application, endpoint client application, etc., that uses, interfaces or has integrated therein functions of the calendar application), and one or more join links 18. For the same of completeness, FIG. 2 also shows an operating system 19 on which the calendar application 16 and meeting client application run. The user device 10 further includes a processor 20 (e.g., a microprocessor or microcontroller), a network interface unit 22 that enables wired and/or wireless network communication, one or more user interface components 24 (e.g., keyboard, mouse, touchscreen, etc.) and a display screen/monitor 26.

The server 30 includes one or more processors 32, a network interface unit 34 and a memory 36. The memory 36 stores instructions for join service server software 38.

The memory 14 and memory 36 shown in FIG. 2 may include read only memory (ROM), random access memory (RAM), magnetic disk storage media devices, optical storage media devices, flash memory devices, electrical, optical, or other physical/tangible memory storage devices. Thus, in general, the memory shown in FIG. 2 may include one or more tangible (non-transitory) computer readable storage media (e.g., a memory device) encoded with software comprising computer executable instructions and when the software is executed (by the associated processor) the processor is operable or caused to perform the operations described herein.

The particular calendar application 16, meeting client application 17 and operating system 19 for a given user device may vary depending on the user device. For example, if the user device is a desktop computer, the operating system will be different from an operating system used on a mobile device (e.g., a Smartphone). Likewise, the meeting client application 17 will be different depending on the particular user device.

A goal is to provide, as much as possible, the same join experience to a meeting using the client software that is available. This involves presenting a unified view during the meeting join phase, no matter what operating system or device from which a user is joins. In other words, the user can be presented with a similar (familiar) user interface regardless of the kind of meeting and what the type of user device platform. In one example, the user interface is reduced to include only parts of the relevant data in order to make it look familiar to the user.

If the meeting organizer prefers to only use a particular type of service, the meeting participant(s) will be informed that there is only one way to join the conference. On the other hand, if there is flexibility as to what type of client software can be used to join the meeting, then the join service presents those options to the participant.

To this end, techniques are provided to negotiate/decide the best available virtual meeting join options for a client/user, based on what is available for and by the meeting organizer. This process is invoked at the time a meeting participant joins a meeting using the aforementioned join link.

Still referring to FIG. 2, the meeting client application 17 uses a meeting identifier, such as a link, to join a meeting, and can display a user interface that will present the various methods of joining the meeting. The meeting client application 17, in it simplest form, is responsible for displaying join (attend) links/buttons to be presented to an end user (meeting participant). These links will show to which domain it is pointing to (WebEx® service, Telepresence, etc.) and instruct the meeting client application 17 to launch a domain software function which will initiate a call to the server 30. This domain software function could be part of the meeting client application software.

The join service server software 38 running on the server 30 is responsible for generating a list of join Uniform Resource Identifier (URI) for a meeting. Each URI may be combined with a machine readable meeting type identifier and a localized human readable description.

Figure 4:
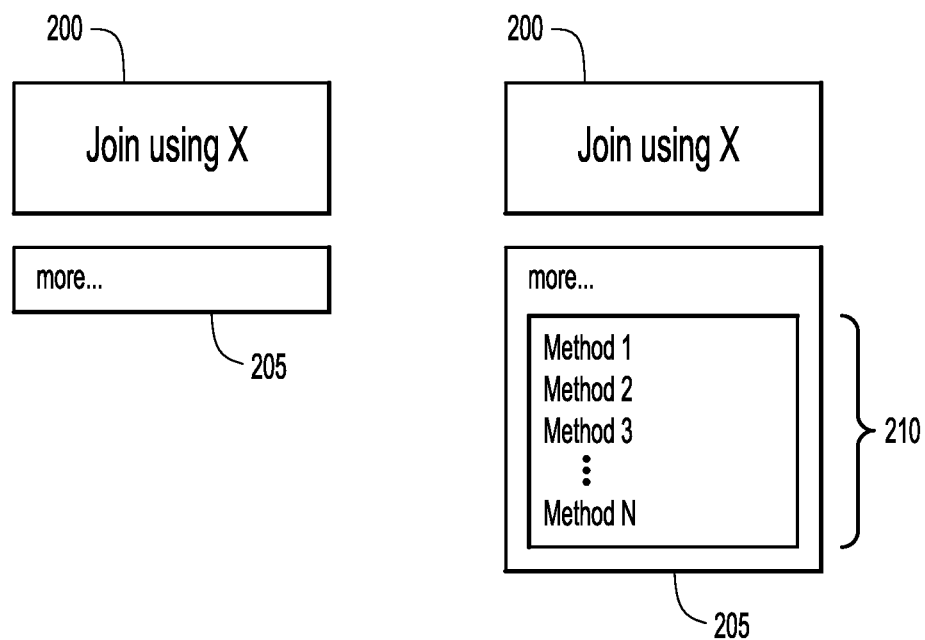
FIGS. 4-10 illustrate user interface alignment schemes for displaying join method options on user devices having different operating systems, according to an example embodiment.

The meeting client application 17 is controlled by the join service server software 38 to present a user interface for joining a meeting with a specific meeting identifier (optionally by a specific organizer e-mail address). If a specific organizer is hosting, the meeting client application 17 will use a method as depicted in FIG. 4 to locate the service that hosts the meeting. If not, the meeting client application 17 will use a static service.

Figure 3:
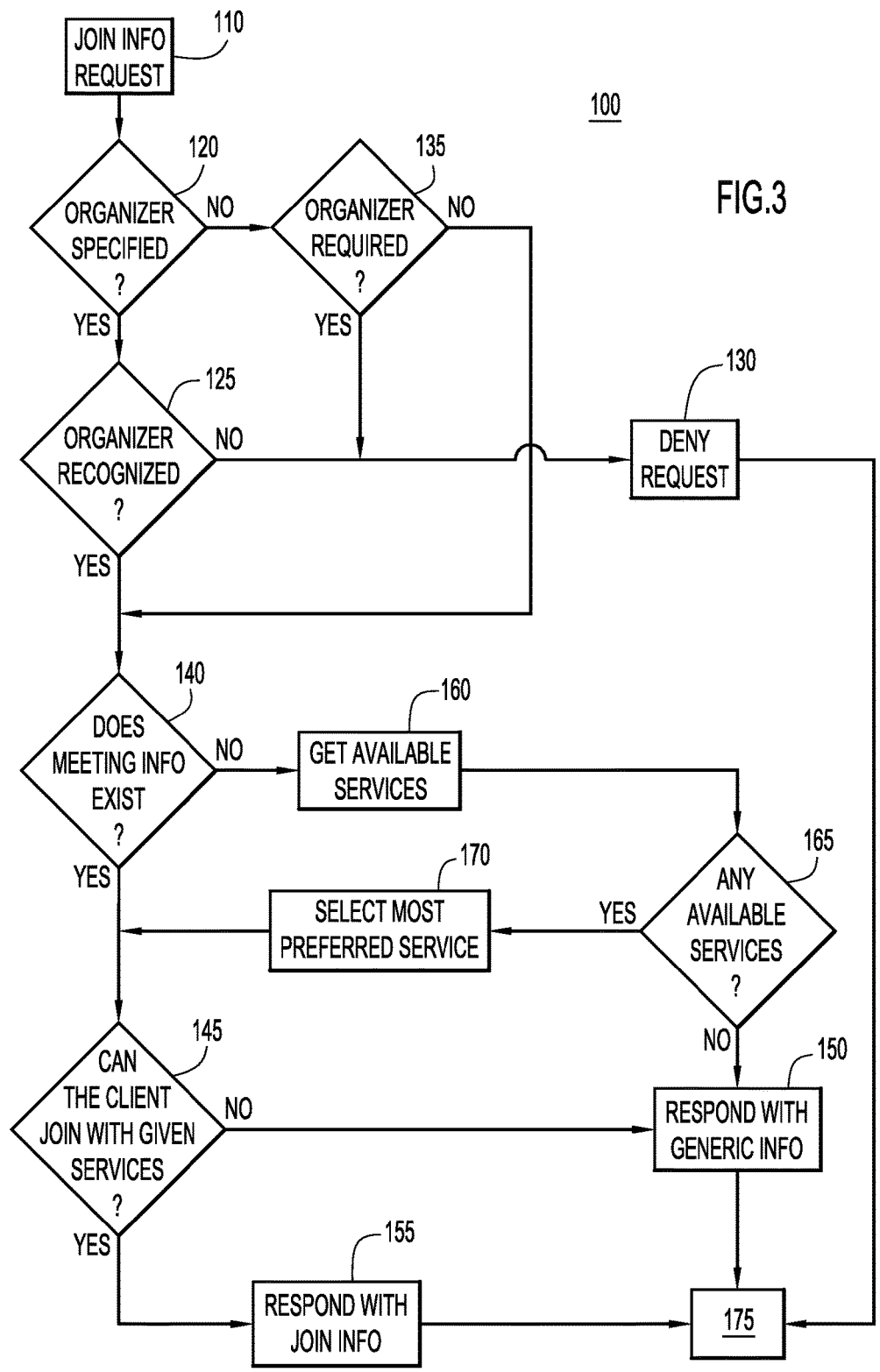
FIG. 3 is a flow chart depicting operations of a method performed by the server, in accordance with an example embodiment.

Reference is now made to FIG. 3. FIG. 3 illustrates a flow chart for a method 100 performed by the join service server software 38. The method 100 begins at 110 where the server receives a request from the meeting client application of a user device, the request includes information requesting the server 30 to generate the attend links/buttons to join a meeting. In the request, the meeting client application 110 passes the meeting identifier, the organizer e-mail (optional), the client supported list of protocols or meeting types (optional), a client platform identifier (optional), the client attendee/participant e-mail and the client user interface language code (optional). The server will determine if the meeting is already created/defined. If the meeting is already created/defined, the server will respond with join methods to this meeting. If the meeting does not exist, and the client application may be allowed to request it to be created, then the server will respond with the join methods to this meeting. If the client application is not allowed, then the server will respond with empty set of join methods.

At 120, the server determines whether the meeting organizer is specified for the meeting the client is seeking to join. If the meeting organizer is specified, then at 125, it is determined whether the meeting organizer is recognized, that is, whether the meeting organizer is one for which the server has stored information. If the meeting organizer is not recognized, then the process continued to 130 where the request from the meeting client application is denied. If the meeting organizer is not specified, then at 135, it is determined whether the meeting organizer address (email address) is required. If it is required, then the meeting join request is denied at 130.

Next, if the meeting organizer is recognized at 125, or the meeting organizer is not required, then at 140 it is determined whether a meeting with a matching meeting identifier (to that contained in the request received from the meeting client application) exists on the server. If the meeting information exists on the server, then at 150 it is determined at 145 whether the client application can join the meeting with the given service. In other words, at 145 it is determined whether the meeting contains restrictions that prevent the client from joining. If there are restrictions that prevent the client from joining, then at 150, a response is sent to the meeting client application. If there are no restrictions that prevent the client application from joining, then at 155, the server responds to the meeting client application with supported join methods. Optionally, at 155, the server may include in the response a link to a meeting specific landing-page, a system-specific landing-page and client installation links. Moreover, if the meeting organizer specified an alternate host for hosting the virtual meetings, the server will redirect the meeting client application to that alternate host.

If at 140 it is determined that meeting information for this meeting does not exist on the server, then at 160 available services for this meeting are obtained. At 165, it is determined whether there are any available services, and if so, then at 170, the most preferred service is selected. In particular, at 170, the server determines the services provisioned for the meeting organizer. If there is no organizer, a default or the client attendee e-mail is used. The server selects the single highest-ordered service that optionally matches the methods supported by the meeting client application.

The meeting client application may optionally evaluate its capabilities and present join methods to the end user. Alternatively, the server may present/point to the meeting application to software available for installation/running directly. The method 100 ends at 175.

Deciding which Join Method to Present to Client

When the meeting client application requests for join methods, the client may send in information to guide the server as to which join method to mark as a default. This optional information is useful for creating a better user experience. The information to send includes, but is not limited to: client capabilities (installed applications specific to online meeting technology), client type (mobile, desktop, etc.), additional user settings (changed default, one time default) and location (inside/outside company buildings, geo-location, at user's desk, etc.)

This information and the possibility of using heuristics will be applied by the server when choosing which method to present to the meeting client application as the default. When a non-user preferred default is presented, or if there are no join methods available, help texts or similar information may be sent in back to the user explaining that the user could perform some action to still be able to join the meeting. For example, this information may inform the user to install a particular application, or to join the meeting with a particular nearby meeting room.

Thus, to summarize, at a high-level, FIG. 3 illustrates a computer-implemented method involving operations performed at a server of: receiving from a user device a request to join an online meeting, the request including a meeting identifier for the online meeting; determining whether a meeting exists with a meeting identifier that matches the meeting identifier contained in the request; and if a match is determined, sending to the user device a message indicating one or more join methods that the user device can use to join the online meeting. The request may include information indicating installed applications on the user device that relate to online meeting technology, type of user device, user settings of the user device and location information of the user device.

Pre-Join Time Rendering

Before the meeting is about to start, the user/participant/attendee may want to determine the capabilities offered for the given meeting. The rendering and placement of information needs to be aligned to and associated with the actual meeting rendering. This is best done with either integration into the existing meeting calendar application or by offering a calendar view in a third party application.

As shown in FIG. 4, a default join method may be displayed prominently. This is shown by the button at 200. However, by clicking on the "more" button 205, a list of additional join methods may be displayed as shown at 210. The clicking the "more" button 205 again, the additional join methods may be removed.

The join information or the capabilities which are available will be rendered next to or instead of the buttons. This would assure the participant that it will be possible to join with his/her preferred method, and the user interface may also offer a "test call" capabilities, showing how a join experience would look like. If there are no methods which the user's meeting client application can utilize, help text may be presented at join time.

Rendering and Placement of Join Buttons in the Meeting Client Application

When presenting the join method(s) to the end user, the meeting client application uses the methods presented to obtain join information. This join information was provided on the basis of the meeting client optionally sending the capabilities of the meeting client application to the server to suggest preferred methods for this meeting client application and user to join a meeting. When this is performed, the join information will in the best case scenario be a single choice of joining the meeting. This single choice may be presented as one button, which when the user clicks will take the user directly into the virtual meeting. This is illustrated in FIG. 4 at the button 200 labeled "Join using X" where X is which the single join method. To allow the user to select a default method, or to select another join method than the default method, the extra menu of join methods can be displayed by selecting the "more" button 205.

When placement for the rendering of a user interface (such as that shown in FIG. 4), the particular meeting client application or user device on which it is displayed affects alignment. As an example, if the meeting client software is running on a Smartphone, then the user interface is integrated with the operating system in a way that gives the user easier access to join the meeting when it is time to join.

Figure 5:
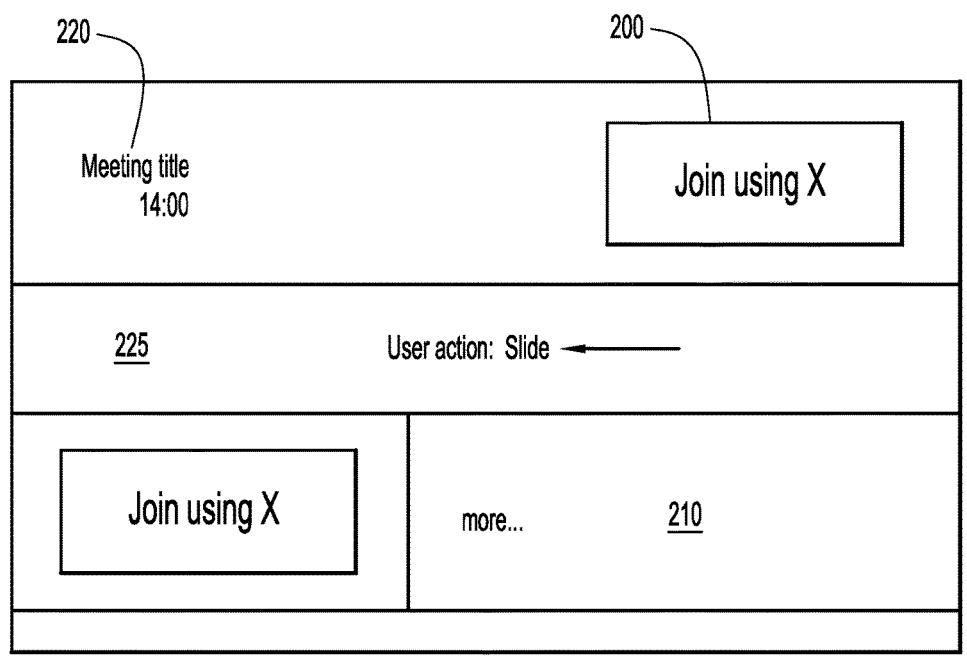

An example of this on a Smartphone platform is shown in FIG. 5. The join button may be included in the "notification center" along with the upcoming calendar notifications. This could allow for a "one-click to join" experience. FIG. 5 shows one notification entry ("Meeting title" at 14:00) at reference numeral 220 and the default join button 200. A slide movement of a graphical element can be provided, as shown at 225, to reveal more join methods as shown at 210.

Similar integrations may be applied to different operating systems, where a common goal of all the integrations is to give a global accessible user interface which is available on a "need-to-join" basis. This could be presented as a menu or tray icon menu. Such a menu will work similar to the "notification center" on some operating systems where the upcoming meeting(s) is displayed along with the join button. This may be presented as illustrated in FIG. 4 but aligned appropriately to integrate with the operating system.

When integrating the join experience into the calendar application, where more screen estate may be available, a different user interface could be presented. At a minimum, the content of FIG. 4 may be shown, but additional options could be presented depending on whether the user is a participant or an organizer. Depending on the calendar application and its capabilities, placement and size may be varied accordingly. In some calendar applications, an integration may involve placing the buttons almost as part of the appointment, whereas in other calendar applications, a sidebar may be provided that shows it more as an external tool compared to the appointment itself.

Another example is when this method for displaying and rendering join information is natively integrated in the calendar application. This may allow for a "tighter" integration of join information into the calendar and notifications produced by the calendar application. For example, a native lock screen notification for a meeting may allow for displaying join method(s) as part of the calendar notification.

Figure 6:
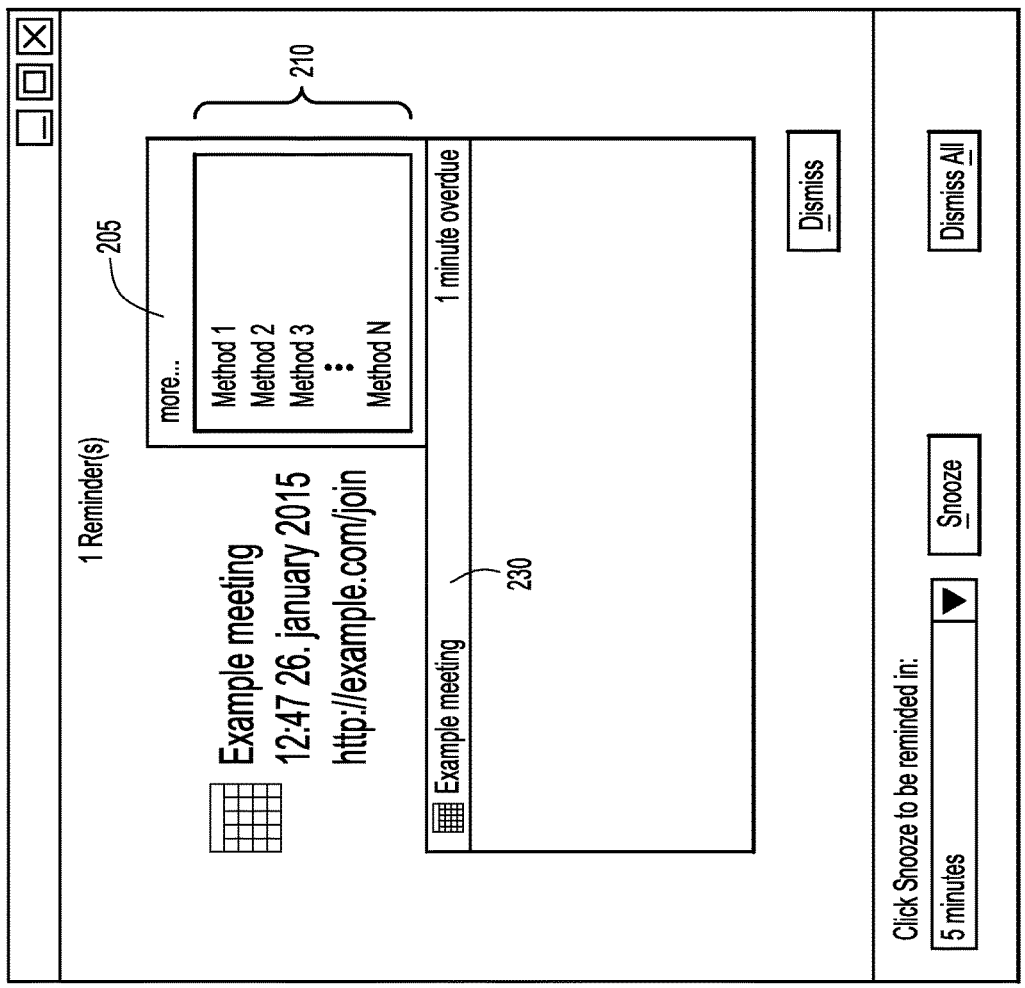

FIG. 6 illustrates one example for integrating into a calendar notification. The more button 205 is displayed and when selected, the list of join method buttons is shown at 210 (similar to that illustrated in FIG. 4). Reference numeral 230 illustrates the meeting reminder notification, for which the join method options may be displayed at 210 when the reminder is selected. FIG. 6 shows that the join methods may be rendered directly into the reminder notification. This allows for "one-click to join" experience directly from the calendar notification.

Figure 7:
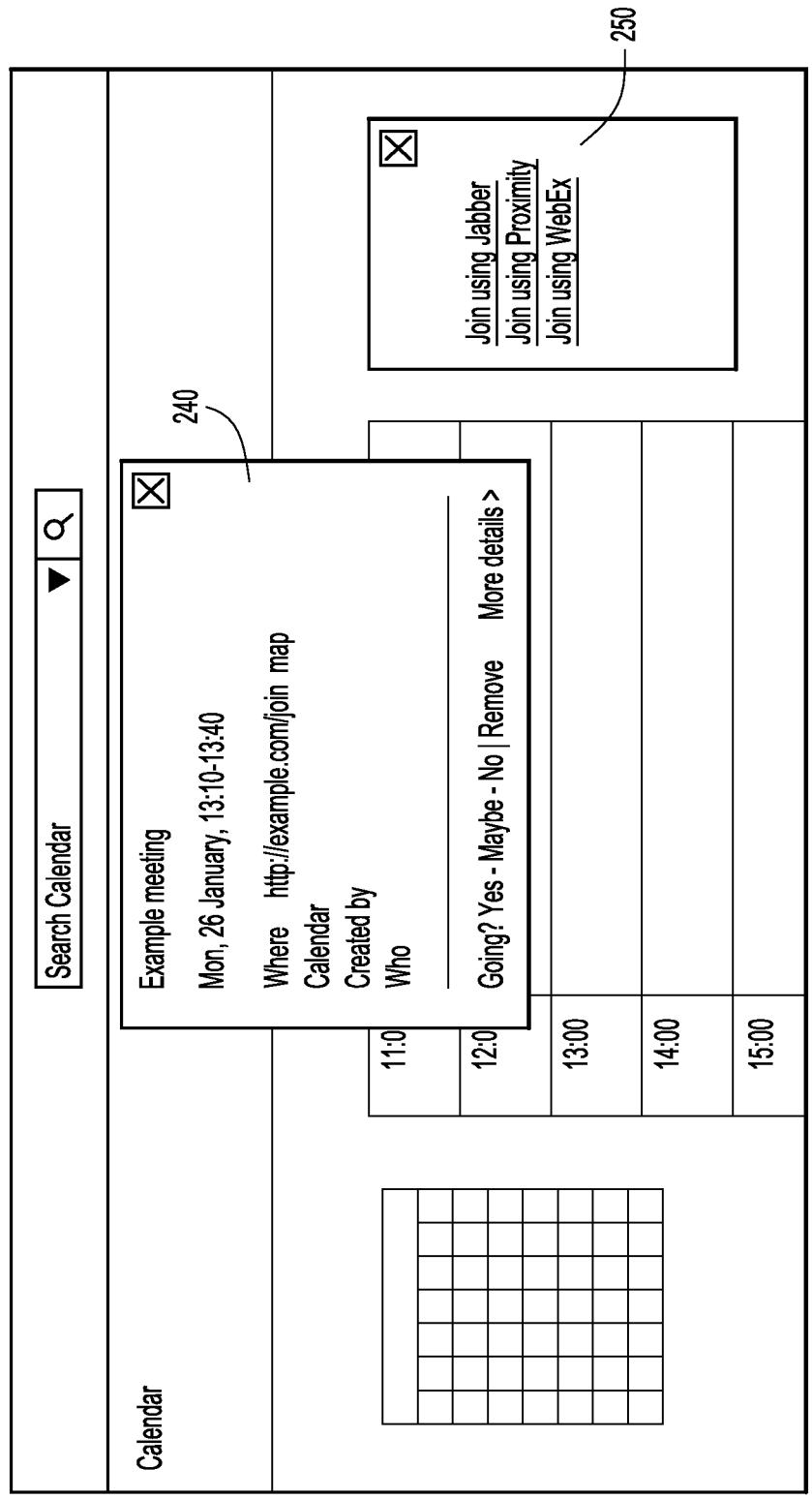

FIG. 7 illustrates still another example of integration in a calendar application. A notification for a meeting is presented as shown at 240. At 250, off to the side, a list (with links) of various join methods to the meeting is presented to the user.

Figure 8:
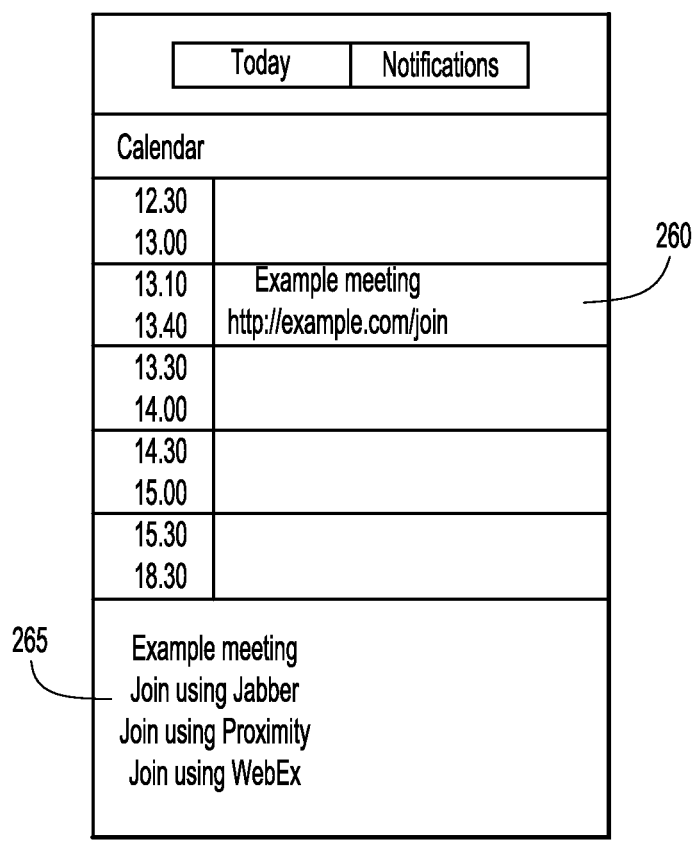

FIG. 8 illustrates still another example of integration in a calendar application on a mobile device. The meeting is shown in a calendar format at reference numeral 260. The list of join methods is displayed separately, outside of the calendar window, at reference numeral 265.

Figure 9:
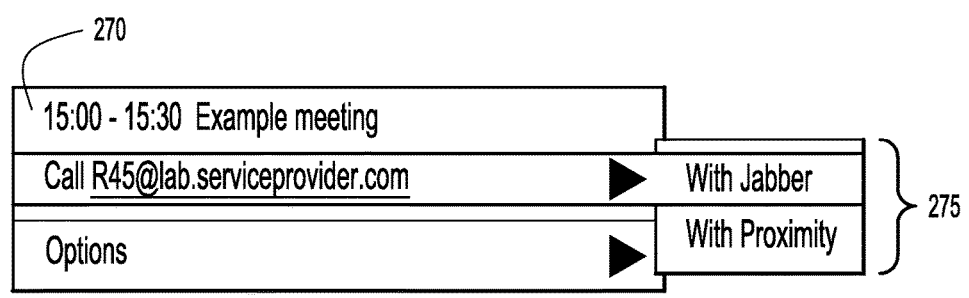

FIG. 9 illustrates yet another example. The meeting is shown in a calendar format at reference numeral 270. The join methods available for joining that meeting are shown in a drop-down menu format to the side of the meeting 270 in the calendar, where the menu is always accessible and will show the upcoming meetings in a list with a menu option to join.

Figure 10:
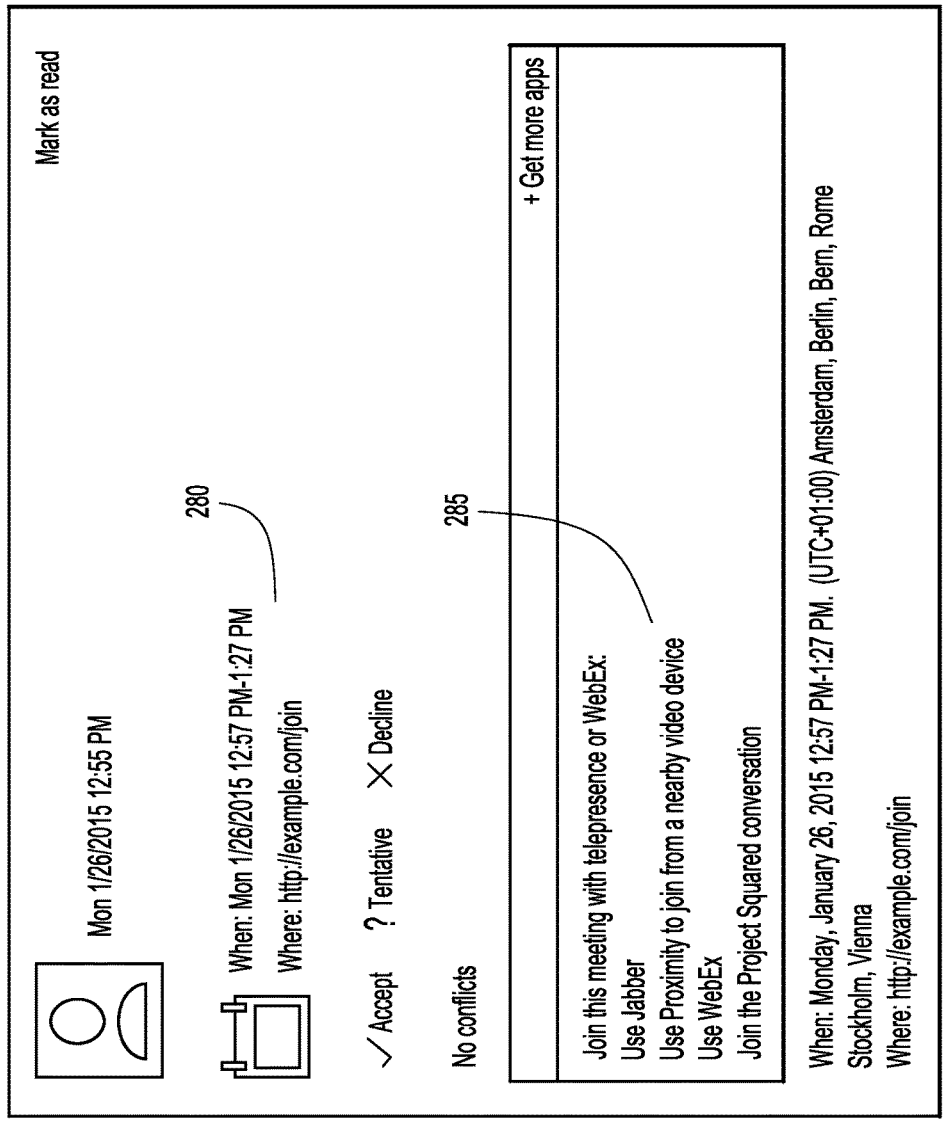

FIG. 10 illustrates yet another example. The meeting is shown at reference numeral 280. The join methods that can be used to join this meeting are shown at reference numeral 285 in a list format.

Figure 11:
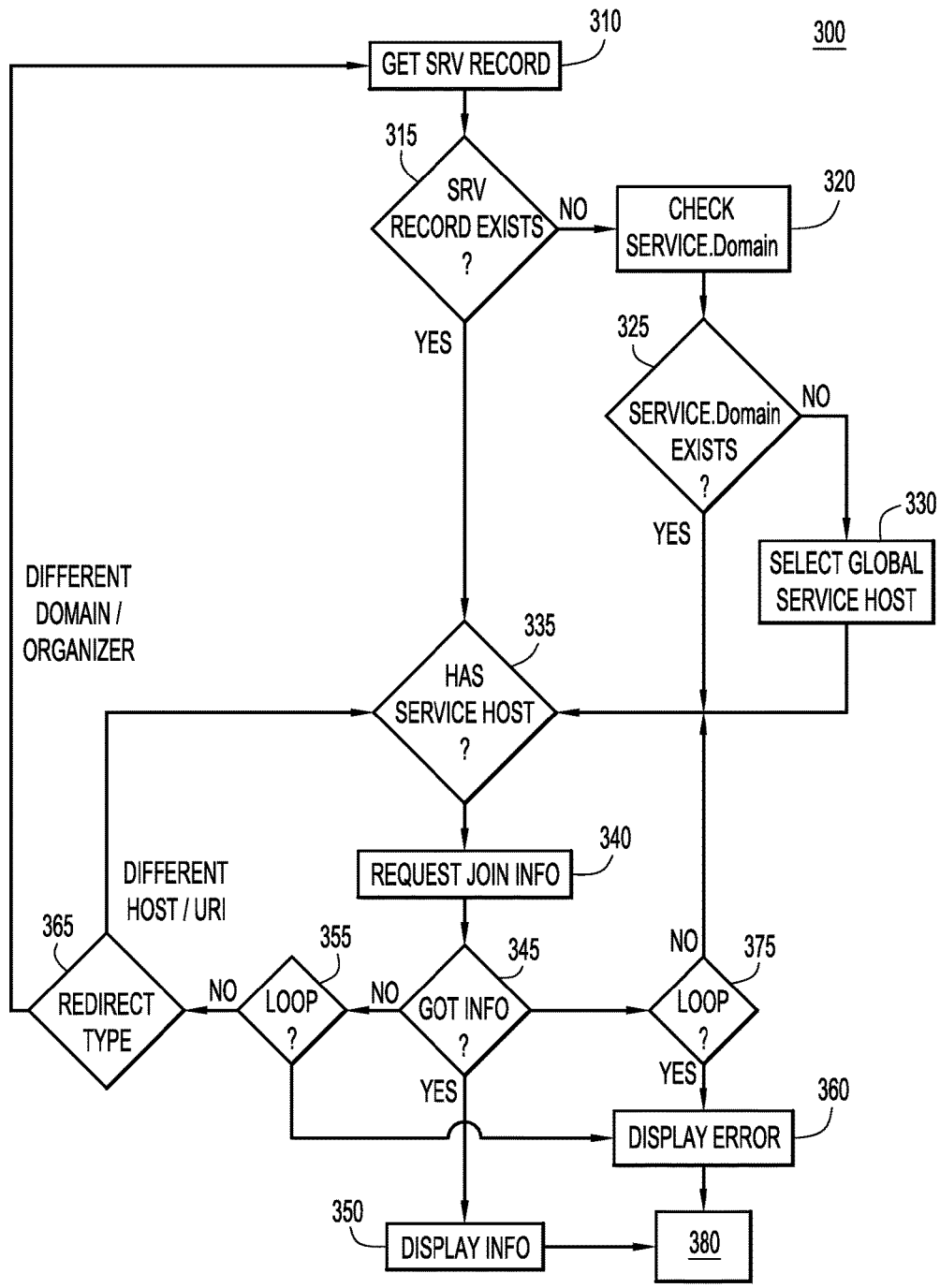
FIG. 11 illustrates a flow chart for a method by which a meeting client application can locate a service that hosts an online meeting, according to an example embodiment.

Reference is now made to FIG. 11. FIG. 11 illustrates a flow chart for a method 300 by which a meeting client application will locate a service that hosts the meeting. At 310, the Domain Name System (DNS) Service (SRV) record is obtained for the meeting. A DNS SRV record is a specification of data defining the location, i.e. the hostname and port number, of servers for specified services. At 315, it is determined whether there is a SRV service record in the meeting information. If there is no SRV record, then at 320, a check is made for the domain of the meeting. If at 325, it is determined that there is no service domain in the meeting information, then at 330, a global service host is selected.

If it is determined at 315 that a SRV record exists, then at 335, the service host is determined from the SRV record. At 340, the join information is requested (initiating the process shown in FIG. 3 and described above. At 345, it is determined whether the join information is successfully obtained. If so, the join information is displayed to the user at 350. If the join information is not successfully obtained but a redirect occurs, then the method goes to 355. At 355, it is determined whether a loop has occurred, and if so, an error message is displayed at 360.

If a loop has not occurred, then at 365, the type of redirect is determined. If the redirect is for a different host/URI, then a path is taken to step 335 and the method continues from there. If the redirect is to a different domain/organizer, then the path is taken back to step 310 and the method continues from there.

If at 345, it is determined that no join information is available, then at 375 it is determined whether a loop has occurred. If a loop has occurred, then at step 360, an error message is displayed. The method ends at 380 after the join information is displayed at 350 or an error message is displayed at 360. If it is determined at 375 that a loop has not occurred, the method continues from step 335.

If there are external participants invited to a meeting, join links (that require registration or password, or pre-authenticated (optionally single-use) links) can be generated by the organizer (or optionally by an internal invitee) and distributed at scheduling time or any time before or during the meeting. This could also include web links to a meeting specific landing page with client download links etc.

The meeting invite could optionally always have links and information injected until adoption of client software or integration is satisfactory.

The default properties for the meeting (e.g. static password, dynamic password distributed in side channel, billing codes, alternate host etc.) may be set by policies by an administrator and optionally changed by meeting resource owner (organizer).

The organizer can be given access to set per-meeting specific options (e.g. password, alternate host etc.), choose meeting technology (cloud personal meeting room or WebEx only etc.) or disable virtual attendance altogether and display a notification to anyone wanting to join virtually. These properties can be stored and take effect when the meeting starts.

Thus, in view of the examples of FIGS. 4-11, the method depicted in FIG. 3 may further include determining which join method the user device should use to join the online meeting, and sending information to the user device to indicate which join method to use. Determining which join method the user device should use may further include identifying one of a plurality of join methods to be used as a default when joining online meetings. In one example, the information may indicate one or more software applications that are available for installation on the user device for joining the online meeting. Still further, the information sent to the user device may cause the user device to display a graphical element indicating a single join method to use for joining the meeting, and/or to cause the user device to display a menu of one or more additional join methods to use for joining the online meeting. The information sent to the user device that causes the user device to display the menu of one or more additional join methods may be configured to cause alignment of menu in a user interface screen of the user device in a manner dependent on the type of user device and operating system of the user device.

Requesting Telephone Connection into Online Meeting Using Existing Scheduling Information In accordance with still further aspects of the embodiments presented herein, techniques are provided that enable a user to join an online meeting using a telephone connection. This may be useful when the join link is not accessible to a user. The join links may be inaccessible due to lack of network connectivity or the meeting host/service is behind a firewall. In any case, the user decides that he/she can only join the meeting by a telephone connection. It is also desirable to be able to join the meeting without the user having to type into his/her phone a Dual-Tone Multi-Frequency (DTMF) code for specifying which meeting to join.

Figure 12:
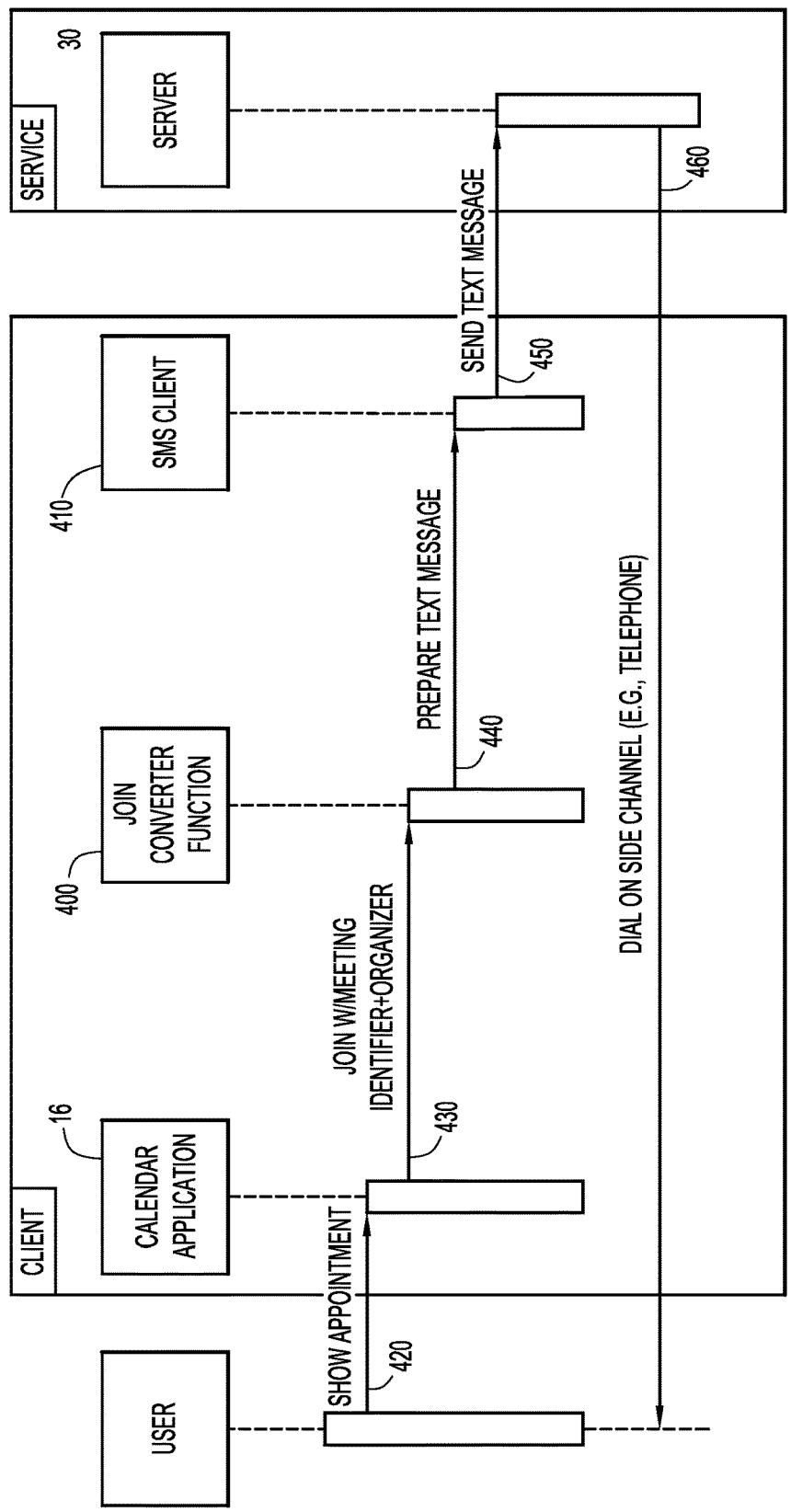
FIG. 12 is a sequence diagram depicting operations performed by a user device and a server to enable the user device to join an audio portion of the online meeting, according to an example embodiment.

Reference is now made to FIG. 12 for a description of a sequence diagram. In this diagram, a function, called a join converter function is shown at reference numeral 400. The join converter function 400 operates between the calendar application 16 and a SMS client function 410. The SMS client function 410 is the function in a Smartphone or other similar mobile device that enables SMS text messaging capability. The join converter function 400 may be a separate piece of software or a plug-in to the calendar application 16 or meeting client application 17.

At 420, a user seeking to join an online meeting enters a command to the calendar application 16 to display a meeting/appointment saved by the calendar application 16. At 430, the calendar application 16 sends a command to the join converter function 400 to join a meeting specified by a meeting identifier and/or meeting organizer identifier. At 440, the join converter function prepares a text message. The text message contains information about the meeting to join (specified by a meeting identifier and/or meeting organizer identifier) and additional information such as a keyword identifying the action (join a meeting) and specified telephone number to call the user (if not specified, the sender number of the text message can be used). If the raw text message content exceeds the size of a single SMS message (160 characters), a hash of the content can be generated to fit content into a single SMS message, or if deemed necessary multiple SMS messages could be used.

At 450, the SMS client function 410 transmits the text message sent to the server 30 shown in FIG. 1) to obtain the information for the actual meeting to which the identifier content in the SMS message points. The destination number for the SMS message that the SMS client sends at 450 can be presented by the web service of the meeting organizer, or it can be an Internet central number that forwards to the hosting service using a Representational State Transfer (REST) application programming interface, etc.

As an example, the content of SMS message may be based on the following information.

iCalendar invite properties: UID: A and Meeting Organizer: B

Additional Properties: C=action/keyword and D=Service telephone number.

The SMS message is generated with a format: "C A B" send to D, with actual data:

A: 54D7044E-E9A0-4BCC-955C-659F567C93D9

B: org@company.com

C: JOIN

D: ############

This would result in an SMS message:

"JOIN 54D7044E-E9A0-4BCC-955C-659F567C93D9 org@company.com" which is sent to ############

At 460, upon receiving the SMS message, the server 30 will instruct an online meeting voice bridge function to dial out to the number indicated in the text message (e.g., the source phone number of the text message) to establish a telephone connection to the user's phone so that the user can participate in the meeting, by audio only, carried by the telephone connection.

The following are example scenarios.

Example 1

The user has an application running on his user device (e.g., Smartphone) with access to a calendar application. An application running on the Smartphone generates a meeting identifier and sends this in a SMS message with a keyword to the server 30. The server 30 will then dial back to the telephone number from which the SMS message was sent. If dial-out service to the user's Smartphone is not available, the server will respond with a SMS message containing the telephone number for the user to dial and optionally an extension number, in order to join the audio portion of the meeting. This number may provide the most local number to dial. For example, the telephone number is chosen based on the country and region specified in the telephone number from or contained in the SMS message sent to the server 30.

Example 2

The user has an application running on his Smartphone with access to his calendar. The application generates a meeting identifier. This meeting identifier with a key, and the number to dial (e.g., telephone number at which to call back to the user to join the user to the audio portion of the meeting, is sent in an SMS message to the server 30. The server 30 will then dial out to the number provided in the SMS message. If dial-out service is not available, the server 30 will respond with an SMS message containing the telephone number to dial and optionally an extension number. This number may provide the most local number to dial (e.g. this is chosen based on the country and region specified in the number (from or contained in the sent SMS message). The user can then use select the telephone number contained in the text message received from the server 30, or manually dial that telephone number.

As depicted in FIG. 12, the reception of the request (at step 110 in the method of FIG. 3), may be an SMS text message from a user device. The text message may include the meeting identifier. In one form, in response to receiving the text message, the server dials out a telephone call to the user device to establish a telephone connection to the user device in order to enable a user of the user device to participate by audio in the online meeting. In another form, in response to receiving the text message, the server sends back to the user device a text message that includes a telephone number to dial in order to participate by audio in the online meeting.

To summarize, a system and method are provided for a unified user experience to join or host a virtual meeting of any type. Only the administrators need to provision and understand meeting technology. The end user only needs to choose what available client he prefers to use when joining the meeting. Any type of virtual meeting can be joined through a single user experience. The host does not have to distribute join numbers or URIs and keep them updated. Only the meeting identifier for the meeting needs to be distributed. Meetings can optionally be created on-demand, and the meeting service technology can be replaced or migrated in the back-end without the need to inform the users. In a mixed on-premises/cloud meeting hosting scenario, the service could satisfy the on-premises meeting services first, and at the point of reaching a certain threshold limit start "overflowing" new meetings to a cloud service (that could have a different service pricing model).

In addition, a system and method are provided by which software with access to a user calendar composes an SMS text message (e.g., with the use of standard properties specified in the iCalendar standard), the content of the SMS text message identifying a meeting that the user mobile wireless device wishes to join. The message is sent to a service that enables connectivity of the mobile wireless or other device to the meeting. This allows a user to join a conference when his device has no Internet connectivity. The meeting calendar entry does not need to be populated with information such as a telephone number to dial. The user need not type in complex meeting numbers when dialing the telephone number.

To summarize, in one form, a computer-implemented method is provided in which a server receives from a user device a request to join an online meeting, the request including a meeting identifier for the online meeting. The server determines whether a meeting exists with a meeting identifier that matches the meeting identifier contained in the request. If a match is determined, a message is sent to the user device, the message indicating one or more join methods that the user device can use to join the online meeting.

In another form, an apparatus is provided including a network interface unit configured to enable network communications; and a processor coupled to the network interface unit and configured to: receive from a user device a request to join an online meeting, the request including a meeting identifier for the online meeting; determine whether a meeting exists with a meeting identifier that matches the meeting identifier contained in the request; and if a match is determined, send to the user device a message indicating one or more join methods that the user device can use to join the online meeting.

In still another form, one or more non-transitory computer readable storage media encoded with instructions that, when executed by a processor, are operable to: receive from a user device a request to join an online meeting, the request including a meeting identifier for the online meeting; determine whether a meeting exists with a meeting identifier that matches the meeting identifier contained in the request; and if a match is determined, send to the user device a message indicating one or more join methods that the user device can use to join the online meeting.

In another example embodiment, a computer-implemented method is provided including: at a server, receiving from a user device text message that includes a request to join an online meeting, the text message including a meeting identifier for the online meeting; and dialing out a telephone call to the user device to establish a telephone connection to the user device in order to enable a user of the user device to participate by audio in the online meeting. An intermediate step may be performed of determining whether a meeting exists with a meeting identifier that matches the meeting identifier contained in the text message so that the telephone call back to the user device is made only when a meeting exists for the meeting identifier contained in the text message.

Similarly, a computer-implemented method is provided including: at a server, receiving from a user device text message that includes a request to join an online meeting, the text message including a meeting identifier for the online meeting; and sending back to the user device a text message that includes a telephone number to dial in order to participate by audio in the online meeting. An intermediate step may be performed of determining whether a meeting exists with a meeting identifier that matches the meeting identifier contained in the text message so that the text message is sent back to the user device only when a meeting exists for the meeting identifier contained in the text message.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
    at a server, receiving from a client application of a first user device a request for links to join an online meeting, the first user device including the client application running on an operating system and being operated by a participant of the online meeting other than a meeting organizer of the online meeting, the request including a machine readable meeting identifier of the online meeting, a meeting organizer identifier that represents the meeting organizer of the online meeting, and information indicating a type of the first user device, user settings of the first user device, and installed applications on the first user device that relate to online meeting technology;
    at the server, determining whether the meeting organizer identifier included in the request is recognized by searching meeting organizer information stored on the server;
    at the server, responsive to determining that the meeting organizer identifier is not recognized, preventing the first user device from joining the online meeting;
    at the server, responsive to determining the meeting organizer identifier is recognized, determining whether an online meeting having meeting information with a machine readable meeting identifier that matches the machine readable meeting identifier included in the request exists;
    at the server, responsive to determining that an online meeting having meeting information with the machine readable meeting identifier that matches the machine readable meeting identifier included in the request does exist, determining which of one or more join methods the first user device could use to join the online meeting based on the information included in the request and supported join methods indicated in the meeting information of the online meeting stored on the server; and
    sending, by the server and to the first user device, a message causing the client application on the first user device to display a user interface integrated with the operating system of the first user device that presents a list of links, each link on the list of links used to launch one of the determined one or more join methods that the first user device can use to join the online meeting and initiating a call to the server using a launched one of the determined one or more join methods in order for the first user device to join the online meeting, wherein for each user device requesting to join the online meeting the server determines supported join methods for that requesting user device and provides a uniform user interface similar to the user interface displayed on the first user device by integrating the uniform user interface to different operating systems running on each of the requesting user devices.

2. The method of claim 1, wherein the information included in the request further includes location information of the first user device.

3. The method of claim 2, wherein the determining which of the one or more join methods the first user device could use further includes identifying one of a plurality of join methods to be used as a default when joining online meetings.

4. The method of claim 2, wherein the sending includes sending information indicating one or more software applications that are available for installation on the first user device for joining the online meeting.

5. The method of claim 2, wherein the sending includes sending to the first user device information to cause the first user device to display a graphical element indicating a single join method to use for joining the online meeting.

6. The method of claim 5, wherein the sending includes sending to the first user device information to cause the first user device to display a menu of one or more additional join methods to use for joining the online meeting.

7. The method of claim 1, wherein the request is received as a text message from the first user device, the text message including the machine readable meeting identifier, and further comprising: dialing out a telephone call to the first user device to establish a telephone connection to the first user device in order to enable a user of the first user device to participate by audio in the online meeting.

8. The method of claim 1, wherein the request is received as a text message from the first user device, the text message including the machine readable meeting identifier and further comprising: sending back to the first user device a text message that includes a telephone number to dial in order to participate by audio in the online meeting.

9. The method of claim 1, wherein the sending includes sending to the first user device information to cause the first user device to integrate and display the determined one or more join methods into a calendar notification.

10. An apparatus comprising:
    a network interface unit configured to enable network communications; and
    a processor coupled to the network interface unit, and configured to:
        receive from a client application of a first user device a request for links to join an online meeting, the first user device including the client application running on an operating system and being operated by a participant of the online meeting other than a meeting organizer of the online meeting, the request including a machine readable meeting identifier of the online meeting, a meeting organizer identifier that represents the meeting organizer of the online meeting, and information indicating a type of the first user device, user settings of the first user device, and installed applications on the first user device that relate to online meeting technology;

determine whether the meeting organizer identifier included in the request is recognized by searching for meeting organizer information stored on the server;

responsive to determining that the meeting organizer identifier is not recognized, prevent the first user device from joining the online meeting;

responsive to determining the meeting organizer identifier is recognized, determine whether an online meeting having meeting information exists with a machine readable meeting identifier that matches the machine readable meeting identifier included in the request exists;

responsive to determining that an online meeting having meeting information with the machine readable meeting identifier that matches the machine readable meeting identifier included in the request does exist, determine which of one or more join method the first user device could use to join the online meeting based on the information included in the request and supported join methods indicated in the meeting information of the online meeting stored on the apparatus; and send to the first user device a message causing the client application on the first user device to display a user interface integrated with the operating system of the first user device that presents a list of links, each link on the list of links used to launch one of the determined one or more join methods that the first user device can use to join the online meeting and initiate a call to the server using a launched one of the determined one or more join methods in order for the first user device to join the online meeting, wherein for each user device requesting to join the online meeting the server determines supported join methods for that requesting user device and provides a uniform user interface similar to the user interface displayed on the first user device by integrating the uniform user interface to different operating systems running on each of the requesting user devices.

11. The apparatus of claim 10, wherein the information included in the request further includes location information of the first user device.

12. The apparatus of claim 11, wherein the processor is configured to identify one of a plurality of join methods to be used as a default when joining online meetings.

13. The apparatus of claim 11, wherein the processor is configured to send to the first user device information to cause the first user device to display a graphical element indicating a single join method to use for joining the online meeting.

14. The apparatus of claim 13, wherein the processor is configured to send to the first user device information to cause the first user device to display a menu of one or more additional join methods to use for joining the online meeting.

15. The apparatus of claim 10, wherein the processor is configured to send to the first user device information to cause the first user device to integrate and display the determined one or more join methods into a calendar notification.

16. One or more non-transitory computer readable storage media encoded with instructions that, when executed by a processor, cause the processor to:

at a server, receive from a client application of a first user device a request for links to join an online meeting, the first user device including the client application running on an operating system and being operated by a participant of the online meeting other than a meeting organizer of the online meeting, the request including a machine readable meeting identifier of the online meeting, a meeting organizer identifier that represents the meeting organizer of the online meeting, and information indicating a type of the first user device, user settings of the first user device, and installed applications on the first user device that relate to online meeting technology;

at the server, determine whether the meeting organizer identifier included in the request is recognized by searching for meeting organizer information stored on the server;

at the server, responsive to determining that the meeting organizer identifier is not recognized, prevent the first user device from joining the online meeting;

at the server, responsive to determining the meeting organizer identifier is recognized, determine whether an online meeting having meeting information with a machine readable meeting identifier that matches the machine readable meeting identifier included in the request exists;

at the server, responsive to determining that an online meeting having meeting information with the machine readable meeting identifier that matches the machine readable identifier included in the request does exist, determine which of one or more join method the first user device could use to join the online meeting based on the information included in the request and supported join methods indicated in the meeting information of the online meeting stored on the server; and send, by the server and to the first user device, a message causing the client application on the first user device to display a user interface integrated with the operating system of the first user device that presents a list of links, each link on the list of links used to launch one of the determined one or more join methods that the first user device can use to join the online meeting and initiate a call to the server using a launched one of the determined one or more join methods in order for the first user device to join the online meeting, wherein for each user device requesting to join the online meeting the server determines supported join methods for that requesting user device and provides a uniform user interface similar to the user interface displayed on the first user device by integrating the uniform user interface to different operating systems running on each of the requesting user devices.

17. The non-transitory computer readable storage media of claim 16, wherein the instructions to cause the processor to send include instructions to cause the processor to send to the first user device information to cause the first user device to display a menu of one or more additional join methods to use for joining the online meeting.

18. The non-transitory computer readable storage media of claim 16, wherein the information included in the request further includes location information of the first user device.

19. The non-transitory computer readable storage media of claim 16, wherein the instructions to cause the processor to send include instructions to cause the processor to send to the first user device information indicating one or more software applications that are available for installation on the first user device for joining the online meeting.

20. The non-transitory computer readable storage media of claim 16, wherein the request is received as a text message from the first user device, the text message including the machine readable meeting identifier, and further comprising instructions to cause the processor to:
   dial out a telephone call to the first user device to establish a telephone connection to the first user device in order to enable a user of the first user device to participate by audio in the online meeting.

\* \* \* \* \*

UNITED STATES PATENT AND TRADEMARK OFFICE
CERTIFICATE OF CORRECTION

PATENT NO. : 10,200,423 B2
APPLICATION NO. : 14/701591
DATED : February 5, 2019
INVENTOR(S) : Magnus Aaen Holst et al.

It is certified that error appears in the above-identified patent and that said Letters Patent is hereby corrected as shown below:

In the Claims

Claim 10, Column 13, Line 16, please replace "information exists with" with --information with--

Signed and Sealed this
Ninth Day of April, 2019

Andrei Iancu
*Director of the United States Patent and Trademark Office*